United States Patent
Romer et al.

(10) Patent No.: US 10,030,508 B2
(45) Date of Patent: Jul. 24, 2018

(54) METHOD FOR MONITORING GAS LIFT WELLS USING MINIMAL CONCENTRATION TRACER MATERIALS

(71) Applicants: Michael C. Romer, The Woodlands, TX (US); Ted A. Long, Spring, TX (US); Tony W. Hord, Spring, TX (US)

(72) Inventors: Michael C. Romer, The Woodlands, TX (US); Ted A. Long, Spring, TX (US); Tony W. Hord, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 15/229,287

(22) Filed: Aug. 5, 2016

(65) Prior Publication Data

US 2017/0107811 A1  Apr. 20, 2017

Related U.S. Application Data (60) Provisional application No. 62/242,061, filed on Oct. 15, 2015.

(51) Int. Cl.
*E21B 47/10* (2012.01)
*E21B 43/14* (2006.01)
(Continued)

(52) U.S. Cl.
CPC ...... *E21B 47/1015* (2013.01); *E21B 41/0092* (2013.01); *E21B 43/122* (2013.01);
(Continued)

(58) Field of Classification Search
CPC .. E21B 43/122; E21B 43/123; E21B 47/1015; E21B 47/10
See application file for complete search history.

(56) References Cited

U.S. PATENT DOCUMENTS

| 4,972,704 A | 11/1990 | Wellington et al. |
| 8,150,637 B2 * | 4/2012 | Peacock ............. E21B 47/1015 166/250.15 |

(Continued)

OTHER PUBLICATIONS

G. Luan and S. He, "A New Model for the Accurate Prediction of Liquid Loading in Low-Pressure Gas Wells," Journal of Canadian Petroleum Technology (Nov. 2012), p. 493.

*Primary Examiner* — Catherine Loikith
(74) *Attorney, Agent, or Firm* — ExxonMobil Upstream Research Company—Law Department (57) ABSTRACT

Evaluating annulus-tubing communication points in a production well having an annulus between a production string and a surrounding string(s) of casing. Determining a composition of production fluids produced from the well, and injecting one or more tracer materials into the annulus of the well under pressure as part of a lift gas. Each of the one or more tracer materials defines a material that is not native to the production fluids, and each has a different rate of diffusivity in the lift gas. The tracer materials are detected upon being produced at the surface. A mass spectrometer or other analyzer capable of detecting tracer materials at concentrations of less than 1,000 ppm is used. Determining injection points of the one or more tracer materials, and determining whether each of the injection points represents a gas lift valve along the production tubing.

26 Claims, 4 Drawing Sheets

(51) Int. Cl.
    *E21B 43/12*    (2006.01)
    *E21B 43/16*    (2006.01)
    *E21B 41/00*    (2006.01)
    *G01M 3/20*     (2006.01)

(52) U.S. Cl.
    CPC ............ *E21B 43/123* (2013.01); *E21B 43/14* (2013.01); *E21B 43/168* (2013.01); *G01M 3/202* (2013.01)

(56) References Cited

U.S. PATENT DOCUMENTS

2004/0050144 A1    3/2004    Bratton et al.
2010/0198533 A1    8/2010    Peacock et al.

* cited by examiner

METHOD FOR MONITORING GAS LIFT WELLS USING MINIMAL CONCENTRATION TRACER MATERIALS

CROSS REFERENCE TO RELATED APPLICATION

This application claims the benefit of U.S. Provisional Application No. 62/242,061 filed Oct. 15, 2015, entitled, "Method for Monitoring Gas Lift Wells Using Minimal Concentration Tracer Materials," the disclosure of which is incorporated herein by reference in its entirety.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of the production of hydrocarbon fluids from subsurface formations. More specifically, the present invention relates to the surveillance of a production well having a gas lift system through the use of very small amounts of tracer materials.

Discussion of Technology

In the drilling of oil and gas wells, a wellbore is formed using a drill bit that is urged downwardly at a lower end of a drill string. The drill bit is rotated while force is applied through the drill string and against the rock face of the formation being drilled. After drilling to a predetermined depth, the drill string and bit are removed and the wellbore is lined with a string of casing.

An annular area is reserved between the string of casing and the surrounding formations. A cementing operation is typically conducted in order to fill or "squeeze" this annular area with columns of cement. The combination of cement and casing strengthens the wellbore and facilitates the zonal isolation of the formations behind the casing strings.

It is common to place several strings of casing having progressively smaller outer diameters into the wellbore. The process of drilling and then cementing progressively smaller strings of casing is repeated several times until the well has reached total depth. The final string of casing, referred to as a production casing, is perforated. The perforations allow reservoir fluids to flow into the wellbore. The final string of casing, referred to as a production casing, is also typically cemented into place before perforating.

As part of the completion process, a wellhead is installed at the surface. The wellhead controls the flow of production fluids to the surface, or the injection of fluids into the wellbore. Fluid gathering and processing equipment such as pipes, valves and separators are also provided. Production operations may then commence.

Additional tubular bodies may be included in a well completion. These include one or more strings of production tubing placed within the production casing or liner. Each tubing string extends from the surface to a designated depth proximate a production interval, or "pay zone." Each tubing string may be attached to a packer. The packer serves to seal off the annular space between the production tubing string(s) and the surrounding casing to aid in moving fluids up the production tubing.

In some instances, the pay zones are incapable of flowing fluids to the surface efficiently. This may be because the reservoir pressure is insufficient to overcome the hydrostatic head in the production tubing. When this occurs, the operator may include artificial lift equipment as part of the wellbore completion. Artificial lift equipment may include a downhole pump connected to a surface pumping unit via a string of sucker rods run within the tubing. Alternatively, an electrically-driven submersible pump may be placed at the bottom end of the production tubing. In addition, gas lift valves may be installed along the production tubing to assist fluid flow to the surface.

Gas lift systems increase well production by injecting a stream of gas via the annulus deep into the wellbore. The gas stream, sometimes referred to as lift gas, enters one or more gas lift valves located in gas lift mandrels along the annulus. The gas lift valves are typically placed along the production tubing just above the production packer during well completion. Multiple gas lift valves are oftentimes used along the annulus to aid production.

Gas lift valves are effectively pressure regulators. In practice, gas is injected from the surface, down the annulus, and through a designed flow profile such as an orifice or nozzle residing in each gas lift valve. The gas stream is a high pressure stream, sometimes up to several thousand psi. Typically, the gas that is injected is recycled gas produced from the well. Such gas may include methane, ethane, propane, nitrogen and related produced hydrocarbon combinations. The injected gas reduces the pressure on the bottom of the well by decreasing the density of the fluids in the production column, effectively increasing the GLR. This, in turn, encourages the fluids to flow more easily to the surface. In addition, the presence of gas in the wellbore reduces the bottom hole pressure which allows the in situ reservoir pressure to drive more reservoir fluids into the wellbore.

A substantial volume of the world's oil production is on gas lift. Gas lift is particularly suited to high-volume offshore wells. A downside to the use of multiple gas lift valves is that the gas lift wells still "work" even when they are not optimized. Wells will typically still flow—albeit at a reduced production rate—even if they are receiving too much (or too little) lift gas and/or are lifting from multiple valves or a valve above the operating point. Field diagnostics and modeling have estimated that less than 25% of gas lift wells are truly optimized.

In the past ten years, the advent of horizontal wellbores to produce shale oil and shale gas has caused gas lift to increase in popularity as an artificial lift method. Industry has been willing to overlook the inefficiency of gas lift, as the ability to produce solids (frac sand) in a deviated wellbore (without concerns of failing downhole pumping equipment) outweighs efficiency issues.

In an attempt to study gas lift valve efficiency, $CO_2$ tracing has been developed as a diagnostic technique. During $CO_2$ tracer testing, a slug of $CO_2$ is injected into the tubing-casing annulus. The slug travels through the gas lift valves and returns to the surface through the production tubing. A gas chromatograph calibrated to detect $CO_2$ is then used for recognizing the $CO_2$ in the production stream. The gas and liquid injection/production transit times are calculated and used to determine which valves are transmitting the slug of gas. This information is then used to determine if the well is lifting from an optimal depth and/or if any valves need replacement.

$CO_2$ tracer testing suggests that a number of gas-lifted wells are not performing optimally. When gas lifted wells are optimized by gas lift technicians, substantially increased production is often achieved. On the other hand, without such diagnostic testing the operator has no way of knowing whether the gas lift valves are functioning property.

There are drawbacks to the tracer-testing process. First, the gas chromatograph or other measurement equipment is bulky. In this respect, multiple large $CO_2$ and $N_2$ bottles are required for tracing and pressurization. For example, U.S. Pat. No. 4,972,704 assigned to Shell Oil Company and issued in 1990, describes a $CO_2$ tracer test in which "[a] gas cylinder containing about 60 pounds of carbon dioxide under a nitrogen blanket was obtained from a gas supply manufacturer" for injection. (See U.S. Pat. No. 4,972,704, col. 8, lns. 19-34). An IR spectrometer was then used to measure and digitally record the concentration of carbon dioxide present in the produced gas. The use of such large tanks and equipment makes transport and handling difficult, particularly in remote areas.

Second, the injected $CO_2$ must overwhelm the baseline concentration of $CO_2$ produced by the well in order to provide a measureable response. Typical measurements at the gas chromatograph are 1 to 15% $CO_2$ in the produced gas. Injection of enough $CO_2$ can be challenging when the gas lift injection pressure or baseline concentration is high. Multiple $CO_2$ and $N_2$ bottles (for maintaining $CO_2$ pressure) may be required.

The '704 Shell patent mentions the use of other tracer materials such as nitrogen, nitric oxide, ammonia, hydrogen, oxygen, sulfur dioxide, and halogenated hydrocarbons such as Freon®. (See U.S. Pat. No. 4,972,704, col. 8, lns. 19-34). However, known tracer testing in the industry commonly uses carbon dioxide as the tracer component, and employs large bottles of $CO_2$ or $N_2$ bottles for detection by the fluid analyzer.

Therefore, a need exists for a system that removes the logistical difficulties of multiple, bulky $CO_2/N_2$ gas cylinders while maintaining the ability to gather the desired information on gas lift injection locations, or casing leak locations.

SUMMARY OF THE INVENTION

A method for evaluating annulus-tubing communication points in a production well is first provided herein. The method is preferably employed to determine a distribution of gas injection across a plurality of gas lift valves. However, the method may also be used to identify tubing leaks, casing leaks and leaks along gas lift valves. Thus, the method involves surveillance of a producing well.

The production well may be completed vertically. Alternatively, the production well may have an extended-length horizontal (or at least deviated) portion that traverses multiple zones across more than 3,000 feet of horizontal hole below the gas lift valves.

In the method, the production well utilizes one or more strings of casing extending below a surface, and a string of production tubing within the one or more strings of casing. In this way, an annulus is formed within the wellbore. The method then includes determining a composition of production fluids produced from the well.

The method also comprises placing up to 1,000 cc's of each of one or more tracer materials into a hand-held vessel. The term "hand-held" means that the vessel is weighted and configured to be transportable by a field worker without the aid of a dolly or other lifting equipment. For example, the vessel may weigh less than 10 pounds or, more preferably, less than 5 pounds, and holds less than 3,000 cubic centimeters of fluid or, more preferably, less than 1,000 cubic centimeters of fluid.

The method next includes causing the one or more tracer materials to be injected from the hand-held vessel into the annulus of the well under pressure as part of a lift gas. Each of the one or more tracer materials defines a material that is not native to the production fluids. The method also includes further injecting the lift gas in order to cause the one or more tracer materials to contact the annulus-tubing communication points residing along the production tubing. As noted, the annulus-tubing communication points are preferably gas lift valves that are spaced along the production tubing.

The method further comprises producing formation fluids along with the lift gas and the tracer materials to the surface. The method then includes detecting the one or more tracer materials at a surface. Beneficially, the tracer materials are detected by a fluid analyzer at concentrations of less than 1,000 ppm. Preferably, a gas chromatograph or a mass spectrometer is used as a fluid analyzer. The fluid analyzer may be installed at a location remote from the production well, but at a location within a designated field in which the production well is produced. Alternatively, the fluid analyzer may be installed at a location proximate the producing well at the surface.

Preferably, the one or more tracer materials are gases at downhole temperatures and pressures. Gases are preferred due to their ease of use and injectibility, and their miscibility with the lift gas. The tracer materials may comprise, for example, Argon, Nitrogen, Oxygen, Sulfur Hexafluoride, He, Xe, or combinations thereof. Preferably, the one or more tracer materials has a total volume in the vessel of less than 1,000 cc's.

The method also includes measuring the concentration of the one or more tracer materials in the produced formation fluids at the surface as a function of time. This is done by using the fluid analyzer.

In one aspect, the method further includes determining injection points of the one or more tracer materials into the production tubing, and then determining whether each of the injection points represents a gas lift valve along the production tubing. The step of determining injection points comprises:

determining an injection time of the one or more tracer materials;

determining a volume of the annulus between the production tubing and the well casing per unit of depth;

determining the flow rate of the lift gas supplied to the well;

determining a velocity of the lift gas in the wellbore; or combinations thereof.

In one embodiment, the step of determining whether each of the injection points represents a gas lift valve along the production tubing comprises:

determining an expected response time for each of the tracer materials, which would indicate that only an appropriate gas lift valve is open; and determining whether the gas lift valves are operating properly by comparing the actual response times of the at least one tracer materials to the expected response times.

The tubing-annulus contact points preferably represent a plurality of gas lift valves spaced along the production tubing. The method preferably comprises determining which of the plurality of gas lift valves is passing the one or more tracer materials into the production tubing. This may be done by graphing a concentration of each of the tracer materials in the production fluids at the surface as a function of time.

In one aspect, the one or more tracer materials comprise at least two tracer components. The method may then further comprise comparing diffusivity rates of each of the at least two tracer components in the lift gas to evaluate a geometry of each of the communication points.

In a more preferred embodiment, the one or more tracer materials comprise at least three tracer materials. Each of the at least three tracer materials has a different rate of diffusivity within the lift gas. The method may then further comprise:
  optimizing the fluid analyzer to detect each of the at least three tracer materials in the production fluids;
  determining a rate of diffusivity of each of the at least three tracer materials;
  determining an expected response time for each of the tracer materials to indicate that an appropriate gas lift valve is open;
  determining an expected concentration of each tracer material and corresponding return times, which would indicate the presence of an open gas lift valve in the wellbore; and
  determining whether the gas lift valves are operating properly by comparing actual response times of the tracer materials to the expected response times.

In one embodiment, the method further includes evaluating a geometry of the gas injection points by analyzing diffusivity and concentration of the tracer materials as a function of time. Evaluating a geometry may include identifying open gas lift valves, identifying restricted gas lift valves, identifying leaks in gas lift valves and identifying leaks in the production tubing. Evaluating a geometry may include inputting data into a program having computer executable instructions.

In another embodiment, the method further comprises repeating the injection steps, the determining step and the evaluating a geometry step a plurality of times over a period of time. Results of the evaluating a geometry step over the period of time are then evaluated to determine historical injection trends for the gas lift valves.

In an additional embodiment, the method further includes replacing any gas lift valves that are determined to be defective based on the historical injection trends. Alternatively, the method includes adjusting selected gas lift valves based on the historical injection trends.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring hydrocarbons, including cyclic terpenes. Examples of hydrocarbon-containing materials include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions. Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, the term "fluid" refers to gases, liquids, and combinations of gases and liquids, as well as to combinations of gases and solids, and combinations of liquids and solids.

As used herein, the term "production fluids" refers to those fluids, including hydrocarbon fluids, which may be received from a subsurface formation into a wellbore.

As used herein, the term "subsurface" refers to geologic strata occurring below the earth's surface.

The term "subsurface interval" refers to a formation or a portion of a formation wherein formation fluids may reside. The fluids may be, for example, hydrocarbon liquids, hydrocarbon gases, aqueous fluids, or combinations thereof. The terms "zone" or "zone of interest" or "pay zone" or "subsurface formation" may be used to refer to a portion of a subsurface interval.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

Description of Specific Embodiments

The inventions are described herein in connection with certain specific embodiments. However, to the extent that the following detailed description is specific to a particular embodiment or a particular use, such is intended to be illustrative only and is not to be construed as limiting the scope of the inventions.

Certain aspects of the inventions are also described in connection with various figures. In certain of the figures, the top of the drawing page is intended to be toward the surface, and the bottom of the drawing page toward the well bottom. While wells commonly are completed in substantially vertical orientation, it is understood that wells may also be inclined and or even horizontally completed. When the descriptive terms "up and down" or "upper" and "lower" or similar terms are used in reference to a drawing or in the claims, they are intended to indicate relative location on the drawing page or with respect to claim terms, and not necessarily orientation in the ground, as the present inventions have utility no matter how the wellbore is orientated. The term "upper" may also refer to proximity to the well head, depending on context.

Figure 1:
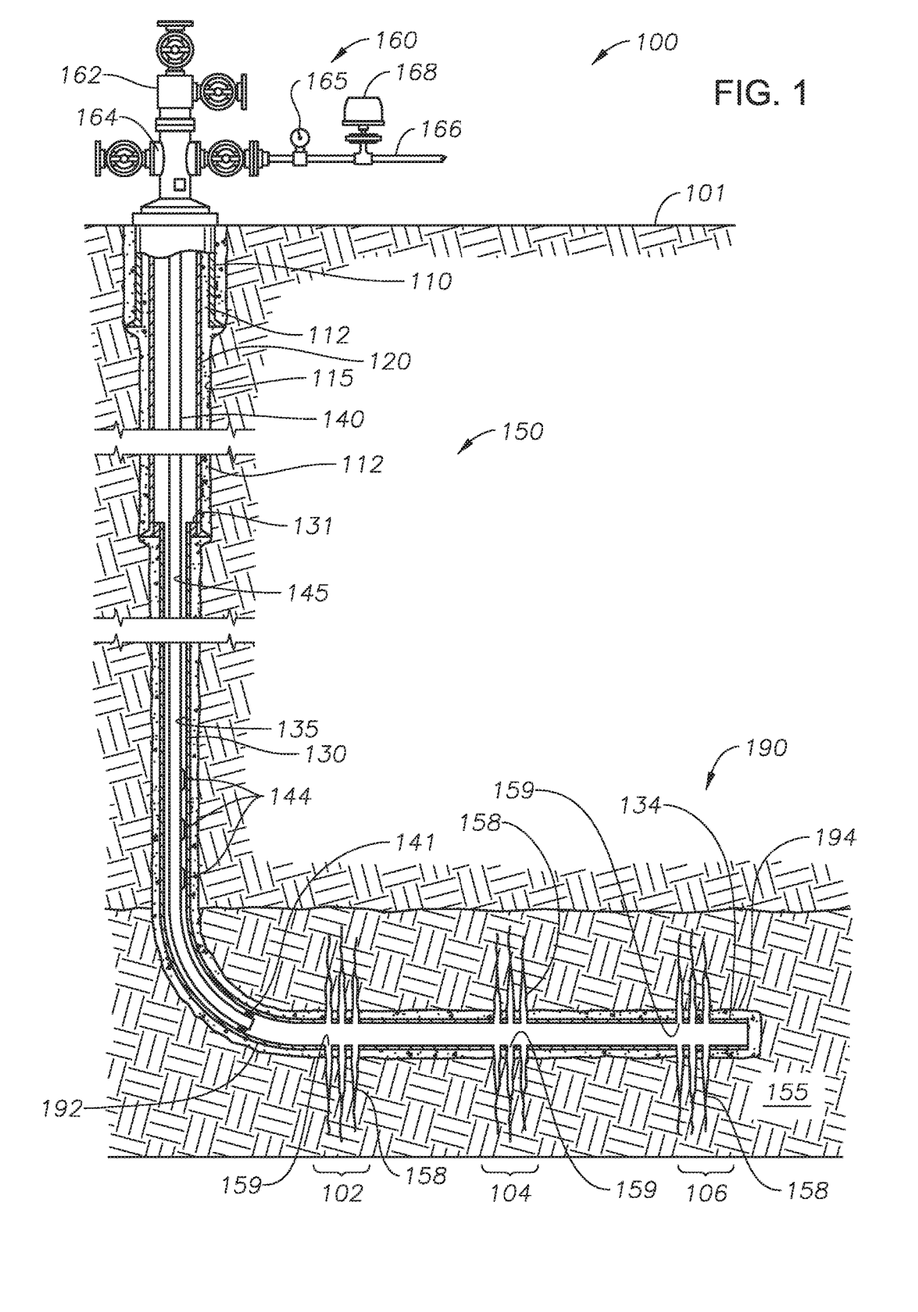
FIG. 1 is a side, cross-sectional view of an illustrative wellbore. Here, the wellbore has been drilled horizontally along a formation, and has been completed with gas lift valves along the production tubing.

FIG. 1 is a side, cross-sectional view of an illustrative well site 100. The well site 100 includes a wellbore 150 extending from the earth surface 101 and down into an earth subsurface 155. The wellbore 150 has been completed as a cased-hole completion for producing hydrocarbon fluids.

The wellbore 150 has been completed with a series of pipe strings, referred to as casing. First, a string of surface casing 110 has been cemented into the formation. Cement is shown in an annular bore 115 of the wellbore 150 around the casing 110. The cement is in the form of an annular sheath 112. The surface casing 110 has an upper end in sealed connection with a lower valve 164.

Next, at least one intermediate string of casing 120 is cemented into the wellbore 150. The intermediate string of casing 120 is in sealed fluid communication with an upper valve 162. A cement sheath 112 is again shown in a bore 115 of the wellbore 150. The combination of the casing 110/120 and the cement sheath 112 in the bore 115 strengthens the wellbore 150 and facilitates the isolation of formations behind the casing 110/120.

It is understood that a wellbore 150 may, and typically will, include more than one string of intermediate casing. In some instances, an intermediate string of casing may be a liner, that is, a pipe string that does not extend back to the surface 101. It is also understood that the upper valve 162 and the lower valve 164 are part of a well head 160, which is schematically shown. The wellhead 160 will include various valves for controlling the flow of fluids into and out of the wellbore 150.

In addition, a production string 130 is provided. The production string 130 is hung from the intermediate casing string 120 using a liner hanger 131. The production string 130 is a liner that is not tied back to the surface 101.

The production string 130 extends into the subsurface formation 155. The production string 130 has a lower end 134 that traverses to an end (or toe) 194 of the wellbore 150. For this reason, the wellbore 150 is said to be completed as a cased-hole well.

The production string 130 has been perforated after cementing. Perforations are shown at 159. The perforations 159 create fluid communication between a bore 135 of the liner 130 and the surrounding rock matrix making up the subsurface formation 155. Fractures 158 are also shown extending out into the formation 155.

As an alternative, end 154 of the wellbore 250 may include joints of sand screen (not shown). The use of sand screens, with or without gravel packs, allows for greater fluid communication between the bore 135 of the liner 130 and the surrounding rock matrix while still providing support for the wellbore 150.

The wellbore 150 finally includes a string of production tubing 140. The production tubing 140 extends from the wellhead 160 down to the subsurface formation 155. In the arrangement of FIG. 1, the production tubing 140 terminates above the perforations 159. However, it is understood that the production tubing 140 may terminate anywhere along the subsurface formation 155.

A production packer 141 is provided along the production tubing 140. The illustrative packer 141 is placed proximate the top of the subsurface formation 155. In this way, the packer 141 is able to seal off the annular region 135 between the tubing 140 and the surrounding production liner 130.

It is understood that rather than using a Christmas tree, the well head 160 may alternatively include a motor (or prime mover) at the surface 101 that drives a pump. The pump, in turn, reciprocates a set of sucker rods and a connected positive displacement pump (not shown) downhole. The pump may be, for example, a rocking beam unit or a hydraulic piston pumping unit. Alternatively still, the well head 160 may be configured to support a string of production tubing having a downhole electric submersible pump (not shown). The present inventions are not limited by the configuration of production equipment at the surface unless expressly noted in the claims.

The wellbore 150 has been completed horizontally within the subsurface formation 155 using directional drilling. This is a common orientation for wells that are completed in so-called "tight" or "unconventional" formations. Horizontal completions not only dramatically increase exposure of the wellbore to the producing rock face, but also enables the operator to create fractures that are substantially transverse to the direction of the wellbore. However, the present inventions have equal utility in vertically completed wells or in multi-lateral deviated wells.

The wellbore 150 includes a horizontal portion 190. The horizontal portion 190 includes a heel 192 and a toe 194. The horizontal portion 190 is intended to represent an extended length wellbore that traverses multiple zones of interest across more than, for example, 3,000 feet of horizontal hole. Along the horizontal section 190 the wellbore 150 has a series of zones 102, 104, 106. Each zone 102, 104, 106 may have its own fluid flow and reservoir characteristics such as pressure, lithology and fluid composition.

The wellbore 150 also includes a series of gas lift valves 144. The gas lift valves 144 reside along the production tubing 140 above the packer 141. The gas lift valves 144 receive lift gas injected into the annulus 135 between the production tubing 140 and the surrounding casing 130. The gas lift valves 144 then inject that gas into a bore 145 of the production tubing 140 for the purpose of reducing the density of the wellbore fluids.

In order to inject the gas, a gas injection line 166 is provided along the wellhead 160. The wellhead 160 includes a gauge 165 and a pressure regulator 168 (or other flow control device). Typically, the gas that is injected is separated gas that has been produced from the subsurface formation 155. A gas compressor (not shown) that is located at the surface 101 near the well site 100 pressurizes gas that is communicated to the annulus 135 of the wellbore 150.

It is observed that during the life of a well, the natural reservoir pressure will decrease as gases and liquids are removed from the formation. As the natural downhole pressure of the well decreases, the gas velocity moving up the well drops below the so-called critical flow velocity. See G. Luan and S. He, *A New Model for the Accurate Prediction of Liquid Loading in Low-Pressure Gas Wells*, Journal of Canadian Petroleum Technology, p. 493 (November 2012) for a recent discussion of mathematical models used for determining a critical gas velocity in a wellbore. In addition, the hydrostatic head of fluids in the wellbore will work against the formation pressure. The result is that formation pressure is no longer able, on its own, to produce gas in commercially viable quantities. The gas lift valves 144 enable production fluids to move up the production tubing 140 by increasing the GLR within the tubing 140, which decreases both the density of the fluid mixture in the well 245 and the back pressure on the formation 155.

Once a gas-lifted well is on-line, only the bottom gas-lift valve will typically be open. Occasionally, a gas-lift valve above the bottom gas-lift valve will open. The bottom one or two gas valves are able to supply sufficient lift gas to enable the well to produce. Over time, additional gas lift valves may open. Unfortunately, there are instances where some gas lift valves that should not be flowing lift gas do open. This can even occur with the bottom-most valve. This results in inefficient operation of the gas lift system. In addition, leaks in the production tubing may also serve as unwanted entry points for lift gas. If excess lift-gas enters the production tubing, it will decrease the production of oil from the well and increase operating costs due to the wasted excess gas.

To determine the operating status of gas lift valves 144, the industry has used so-called "tracer gas" to detect the operation of gas lift valves within a wellbore. As noted, U.S. Pat. No. 4,972,704 issued in 1990 to Shell Oil Company, disclosed a method for "troubleshooting gas-lift wells" by using a tracer gas. According to the disclosed method, a quantity of tracer gas is injected into the lift gas at the well head. Its return within the production fluids produced from the well is monitored as a function of time. The tracer's return pattern may be correlated with the depth of entry points and volumes of lift gas entering along the length of the production tubing. In this way, an analyst may identify whether gas lift valves on the production tubing are open or closed.

In the '704 patent, Shell Oil Company proposed various tracer materials, including the use of carbon dioxide as the tracer gas. However, as noted above, there are drawbacks to the use of $CO_2$ or other tracer gas slugs. These include the fact that the gas tanks and the gas chromatography (or other measurement equipment used at the well site) is heavy and bulky. In addition, the injected $CO_2$ must overwhelm the baseline concentration of $CO_2$ produced by the well in order to provide a measureable response.

Recent improvements in powerful, compact CPU's and low-cost memory have led to the development of portable, high-resolution mass spectrometers and gas chromatographs. Field-rated units that can detect compounds at low ppm concentrations can now be purchased for less than $100,000. An example is the Pfeiffer OmniStar™ mass spectrometer, described at http://www.pfeiffer-vacuum.com/en/products/analysis-equipment/gas-analysis/gas-analysis-in-the-pressure-range-of-up-to-1-000-hpa/omnistar-gsd-320-o/. It is determined herein that such new spectroscopy or chromatography equipment will now allow the usage and detection of tracing chemicals in extremely small volumes that heretofore have not been considered.

Based on this technological development, a method is offered that uses very small quantities of tracing chemicals or elements that can be transported to well sites in small volumes, such as handheld containers holding less than 1,000 cc's of fluid. The tracing chemicals may be injected into the tubing-casing annulus at high pressures as part of the lift gas, without external pressure support. The tracing chemicals may then be detected and measured at ppm concentrations.

Figure 2:
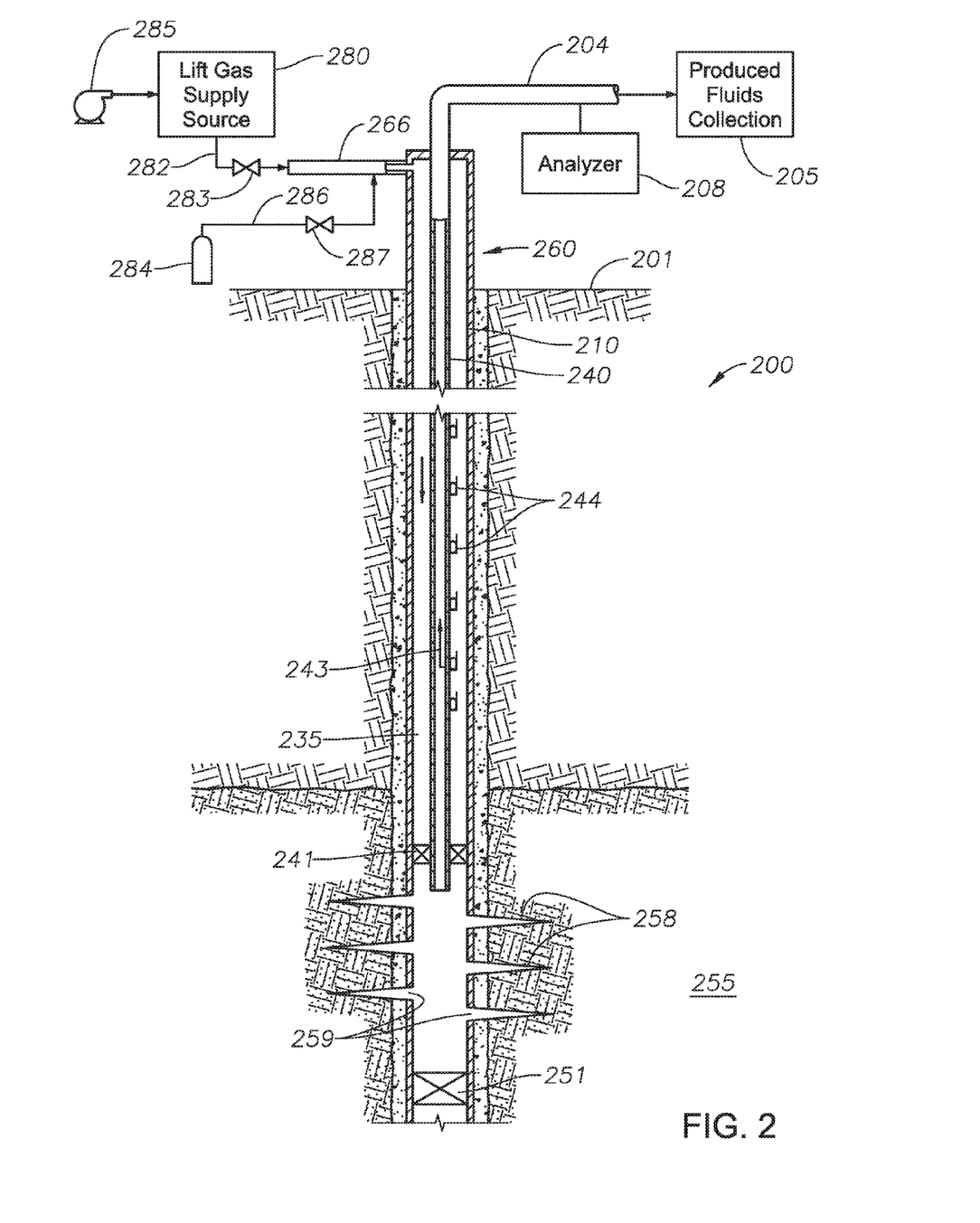
FIG. 2 is another side, cross-sectional view of an illustrative wellbore. Here, the wellbore has been completed vertically, and is being produced with the aid of a gas lift system.

FIG. 2 is side, cross-sectional view of another illustrative wellbore 200. Here, the wellbore 200 has been completed vertically. Of interest, the wellbore 200 is being produced with the aid of a gas lift system. Applicant should acknowledge here that FIG. 2 is similar to FIG. 1 of U.S. Pat. No. 4,972,704, referred to above. However, in FIG. 2 the gas vessel 284 is intended to be substantially smaller and substantially lighter in weight, greatly enhancing portability. In addition, the analyzer 208 is uniquely configured to detect chemical concentrations at ppm, or even ppb, concentrations upon return with the production fluids.

As with wellbore 150 of FIG. 1, wellbore 200 includes a string of surface casing 210. In the illustrative view of FIG. 2, only one string of casing 210 is shown, with this string 210 extending down to a subsurface formation 255. It is understood, of course, that a series of progressively smaller o.d. casing strings will be cemented into place in a typical wellbore.

The wellbore 200 also includes a production tubing 240. A production-tubing annulus 235 is formed between the production tubing 240 and the surrounding casing 210. The production tubing 240 extends down proximate to a top of the subsurface formation 255. A packer 241 is provided to seal the annulus 235 near a bottom of the production tubing 240.

The casing 210 has been perforated along the subsurface formation 255. Illustrative perforations are shown at 259. In addition, the formation 255 has been fractured through the perforations 259. Illustrative fractures are seen at 258. Additionally, an optional bridge plug 251 has been set below the perforations 259.

A series of gas lift valves 244 has been placed along the production tubing 240. The gas lift valves 244 receive an injection of "lift gas" from the surface 201. Arrow 243 indicates a direction of flow for the injected lift gas.

A lift gas supply source 280 supplies lift gas through a lift gas supply line 282. The supply source 280 is pressurized through a compressor 285. A valve 283 along line 282 monitors pressure of the lift gas as it enters the annulus 235. This may include, for example, an orifice meter.

The lift gas enters the annulus 235 between the well casing 210 and the production tubing 240. Reservoir fluids from the formation 255 enter the casing 210 through perforations 258, and are carried up the production tubing 240 under in situ pressure. Fluids produced from the wellbore 200 exit from the wellbore 200 at the surface 201 through a produced fluid line 204. Thereafter, production fluids flow to a produced fluids collection facility 205 for processing and/or sale.

To effectuate gas tracer testing, an injected fluid supply source 284 is connected to the lift-gas supply line 266 by an injected fluid supply line 286, which contains at least one valve 287. The injected fluid comprises one or more tracer materials. A quantity of an injected fluid, which is sufficient to provide tracers in a quantities that will be detectable in a produced fluid recovered from the well 200 by the fluid analyzer 208 is injected as a pulse into the lift-gas supply line 282 near the well head 260. The lift gas, containing the injected tracer material, travels down the annulus 235 between the production tubing 240 and the surrounding well casing 210, entering any openings (annulus-tubing communication points) along the production tubing 240.

The tracer materials enter the production tubing 240 with the lift gas and comingle with the reservoir fluids. The fluid analyzer 208 is attached to the produced fluid line 204. A separator (not shown) may be associated with the analyzer 208 to segregate a portion of produced fluid for analysis. The analyzer 208 is used to detect the presence and/or monitor the proportion (or concentration) of the tracer materials in a produced fluid as a function of time.

The fluid analyzer 208 preferably generates a histogram showing the concentration of each of the tracer materials in the fluid returns as a function of time. By knowing ahead of time where the gas lift valves are along the production tubing, the operator can quickly determine which gas lift valves are open and which ones are not by the histogram to the wellbore data. (An example of a $CO_2$ histogram can be seen in FIG. 2 of U.S. Pat. No. 4,972,704.)

Ideally, the operator will determine the volume of the annulus between the casing and the production tubing per unit of depth. The operator will also determine the approximate location or depth of the gas lift valves along the production tubing, and the flow rate for lift gas supplied to the well. A velocity of the lift gas can then be determined, which tells the operator, the time required for the tracer materials to return to the surface in a produced fluid.

By determining the entry time of the tracer materials into the production fluid, the point of entry of the lift gas into the production tubing 240 may also be determined. There may be several points of entry of lift gas along the production tubing 240. Multiple entry points indicate open gas lift valves and/or tubing leaks. By knowing the number and approximate depths of the various gas-lift valves 244, it is possible to determine which valves are open, which valves are closed, and whether there are any leaks in the production tubing 240.

Methods of tracer testing using a single tracer material in large quantities are known. Some of these are set out in U.S. Pat. No. 4,972,704, referred to above and now incorporated herein by reference in its entirety. Steps for performing such methods need not be repeated herein. However, it is proposed herein to conduct tracer testing, or production well surveillance, using a fluid analyzer 208 that is capable of detecting a tracer material, or multiple tracer materials, at concentrations of less than 1,000 ppm. This is far lower than what was envisioned in the '704 patent and by the industry.

Options for tracer materials at minimal concentrations in the present method include sulfur hexafluoride ($SF_6$), Argon (Ar), and Xenon (Xe), Nitrogen ($N_2$), Oxygen ($O_2$), Helium (He). Preferably, a combination of these materials is used, with each material offering a different diffusivity in the carrier lift gas. These chemicals can be purchased in fluid form and in specified volumes in small, single-use or reusable vessels or tanks. The tanks can be transported by vehicle and in some cases, aircraft. One source of small vessels for holding compressible fluids is Leland Gas Technologies of South Plainfield, N.J. Examples of disposable gas cylinders are shown at /www.lelandltd.com/disposable_gas_cyl.htm. Portable, hand-held, gas-filled cylinders available from Leland range in length from about 1 inch to 19 inches.

If the selected tracer is a high pressure gas, or a gas mixed with a high pressure gas as a carrier medium, the gas may be directly transferred from the vessel 284 into a sample port on the gas lift injection line 282. In this instance, the vessel 284 may be a small, hand held gas cartridge or gas bottle. If in liquid phase, it may be injected at the small volume required using a high-pressure syringe. In this instance, the vessel 284 is a hand held syringe. In any instance, it is preferred that the vessel hold no more than 1,000 cubic centimeters of fluid, and weigh no more than 10 pounds.

In one embodiment, a 3,000 psi-rated cylinder is used to hold a tracer fluid of Argon. The Argon is injected from the cylinder into a lift gas line comprising primarily methane. The lift gas has a density of 0.04165 lb./ft$^3$, while the tracer gas has a density of only $7.47 \times 10^{-4}$, or 0.000747 lb./cc. The lift gas is injected at a rate of 1,483 ft$^3$/day, while the produced gas flows at a rate of 70 ft$^3$/day. This results in a total gas rate of 1,553 ft$^3$/day and an injection ratio of 0.955.

In this example, a total of 9.0 cc's of argon is injected. During the "transit" time, the argon will diffuse into the lift gas, and then further diffuse into the production fluids upon entry into the production tubing. In one aspect, a separate tracer gas such as helium, nitrogen or oxygen is also injected. The additional tracer(s) will also be injected in a small quantity, such as less than 100 cc's, and will also diffuse. Upon return to the surface, the fluid analyzer detects the very small quantities of tracer amounts as a function of time.

Beneficially, the fluid analyzer 208, which may be a portable mass spectrometer or gas chromatograph, may be optimized to detect multiple tracer chemicals as a defined "cocktail" of tracers. Using a "cocktail" provides more accurate feedback to the analyst concerning gas lift valve efficiency and the annulus-to-production tubing injection flow paths. It is observed that different tracer materials have different diffusivity properties. Combining several tracers as a "cocktail" into a single injection serves to "spread out" in the background gas stream (lift gas) at different rates. This results in surface detection of the components at offset time scales. Furthermore, the varying diffusivities cause the annulus-tubing injection points to pass the tracers at different mass flow rates, which further depends on the porosity (IDs), constrictivity, and tortuosity of the injection flow paths. An equation for diffusivity in porous media may be employed.

The following table offers an example of how different tracer materials have different coefficients of diffusivity:

TABLE 1

| Diffusivity Coefficients (cm$^2$/sec) at 150° F. and 1,500 psi | |
| --- | --- |
| Ar—$CH_4$ | $2.52 \times 10^{-03}$ |
| $H_2$—$CH_4$ | $8.95 \times 10^{-03}$ |
| He—$CH_4$ | $8.20 \times 10^{-03}$ |
| $N_2$—$CH_4$ | $2.62 \times 10^{-04}$ |
| $O_2$—$CH_4$ | $2.80 \times 10^{-03}$ |
| $SF_6$—$CH_4$ | $1.37 \times 10^{-03}$ |
| Comparative | |
| He vs. $SF_6$ | 6.0 |
| He vs. Ar | 3.3 |
| He vs. $N_2$ | 31.3 |
| Ar vs. $SF_6$ | 1.8 |

As presented in Table 1, the diffusivity of each of a series of components in methane is shown. The materials are, in order, argon, hydrogen, helium, nitrogen, oxygen and sulfur hexafluoride. Argon, hydrogen, helium, nitrogen and oxygen are, of course, elements, while sulfur hexafluoride is a compound known as a tracer material in the nuclear industry. The rate of diffusivity for sulfur hexafluoride, for example, is shown as $1.37 \times 10^{-03}$.

In Table 1, diffusivity is an area of diffusion (measured in square centimeters) per second. It is readily observed that some materials diffuse faster in methane than others, though the rate of diffusivity is not necessarily indicative of preference. Indeed, it is the discrepancy between the materials that creates value in the use of a tracer material having a combination of substances. In this way, histograms of percentage of a component vs. cumulative time may be generated separately for each component, providing a way to check results internally.

Methane is chosen as the illustrative carrier fluid in Table 1 as it will likely be the predominate component in the lift gas of the present methods. As the methane carries the tracer components down the annulus 235, pressure within the annulus 235 will initially drop. For gases, diffusivity will vary with pressure because the fluid density changes with pressure. As the tracer components travel down the annulus further, they will begin to mingle with formation fluids that have entered the wellbore. This will cause the tracer components to diffuse, reducing its concentration over time. Diffusion will further occur as the lift gas invades the bore 245 of the production tubing 240 and returns to the surface 201.

Table 1 also shows a comparison of diffusivity coefficients as between the components. For example, helium is shown to diffuse in methane six times faster than sulfur hexafluoride. Argon is shown to diffuse in methane only 1.8 times faster than sulfur hexafluoride. These differences in diffusivity will in turn create separate histograms to be created in response to analysis by the analyzer 208.

Differences in detection initiation times, detection duration, and measured concentrations of components provide useful information regarding the injection flow paths. If one knows the rate of diffusivity of two different substances, a comparison of the rates is indicative of the size of the opening. This, in turn, is indicative of the nature of the opening. Thus, one may determine from detection trending whether a detected injection point is a gas lift valve, a hole in the production tubing 240, or leaky connections along the tubing 240, even without knowing the wellbore architecture.

Additionally, by comparing historical trends of tracer test results, one may determine whether the orifice in a gas lift valve has eroded or has become plugged over time. Although abnormal/unexpected injection points can be identified with current technologies (albeit through the use of much larger quantities of tracer material), it is not possible to glean the richer information that a mixture of tracers with varying diffusivities can provide.

It is observed that the tracer injection amounts proposed herein are far smaller than tracer amounts used in known gas lift surveillance methods. Tracer amounts of less than 1,000 cc's and, more preferably, less than 100 cc's, are used herein. In addition, the fluid analyzer 208 is capable of detecting tracer concentrations in much lower amounts than in currently-used field fluid analyzers. In one aspect, the fluid analyzer 208 detects tracer materials at concentrations of less than 1,000 ppm or, more preferably, less than 500 ppm.

Based on the above description, a method for evaluating annulus-tubing communication points in a production well is provided herein. The method 300 is presented in FIGS. 3A and 3B together. The method 300 is preferably employed to determine operability of a series of gas lift valves 244 along a string of production tubing in the well. The production well may be completed vertically; alternatively, the production well may have an extended length horizontal (or at least deviated) portion that traverses multiple zones across more than 3,000 feet of horizontal hole below the gas lift valves 244.

Figure 3A:
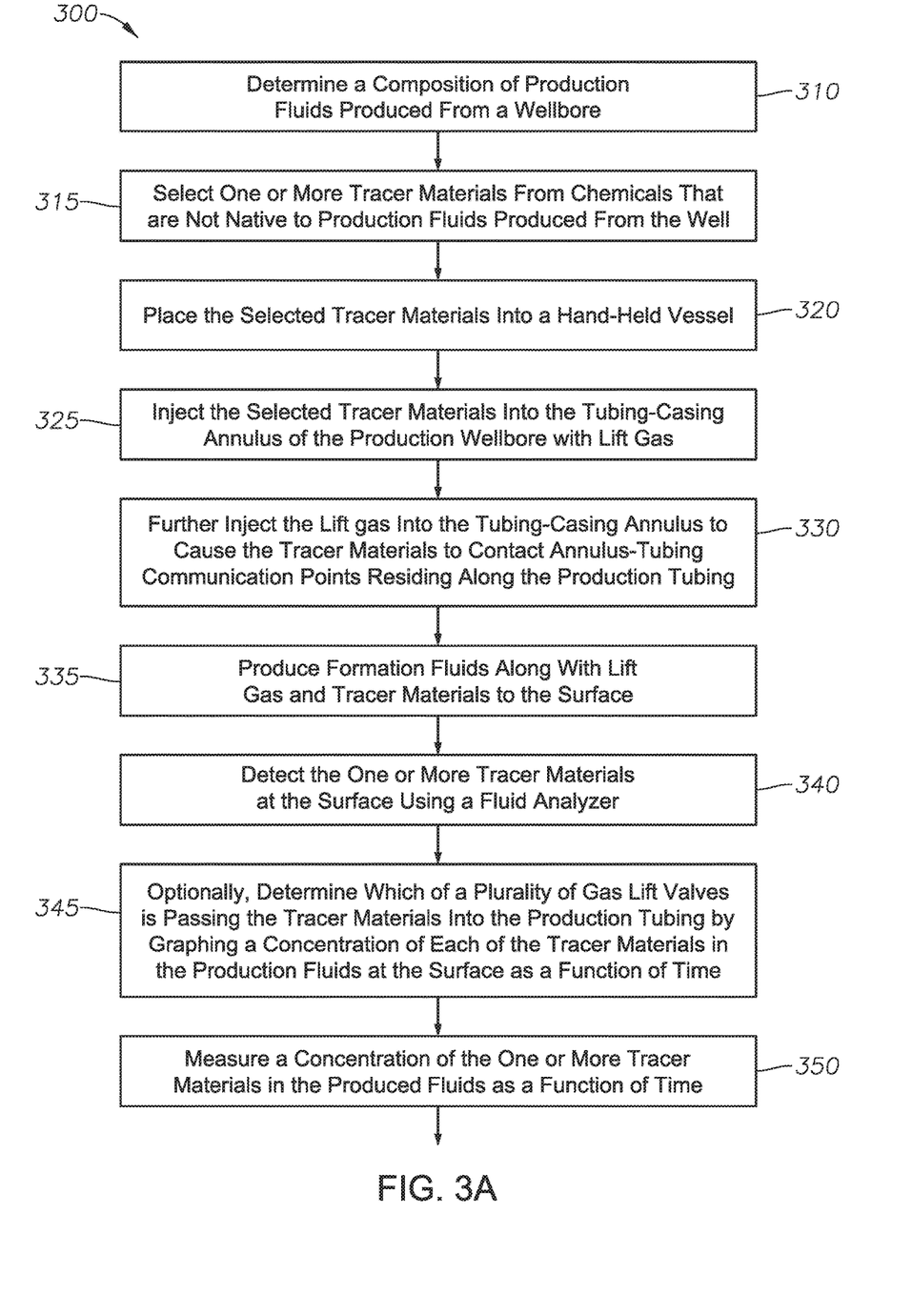
FIGS. 3A and 3B present a single flowchart for a method of evaluating annulus-tubing communication points, in one embodiment. The method involves injecting one or more tracer materials into the annulus of a wellbore between the production tubing and the surrounding casing, and analyzing fluid returns from the wellbore to determine fluid composition and volumes as a function of time.

In the method 300, the production well utilizes one or more strings of casing extending below a surface, and a string of production tubing within the one or more strings of casing. In this way, an annulus is formed within the wellbore. The method 300 then includes determining a composition of production fluids produced from the well. This is presented at Box 310.

The method 300 also comprises selecting tracer materials that are not native to fluids produced from the well. This selection step is given at Box 315. Preferably, the one or more tracer materials are gases at downhole temperatures and pressures. The tracer materials may comprise, for example, Argon, Nitrogen, Oxygen, Sulfur Hexafluoride, He, Xe, or combinations thereof.

The method also comprises placing up to 1,000 cc's of one or more tracer materials into a hand-held vessel. This is indicated at Box 320. The term "hand-held" means that the vessel is weighted and configured to be transportable by a field worker without the aid of a dolly or other lifting equipment. Preferably, the one or more tracer materials has a total volume in the vessel of less than 1,000 cc's.

The method 300 next includes causing the one or more tracer materials to be injected from the vessel into the annulus of the well under pressure as part of a lift gas. This is seen at Box 325. The method 300 then includes further injecting the lift gas in order to cause the tracer materials to contact the annulus-tubing communication points residing along the production tubing. This is indicated in Box 330. As noted, the annulus-tubing communication points are preferably gas lift valves that are spaced along the production tubing. However, they may also be unwanted holes in the tubing or in gas lift valves.

The method 300 further comprises producing fluids to the surface. This is seen at Box 335. The fluids are return fluids that comprise formation fluids along with the lift gas and the tracer materials. The method 300 then includes detecting the one or more tracer materials at the surface. This is provided at Box 340. Beneficially, the tracer materials may be detected by the fluid analyzer at concentrations of less than 1,000 ppm.

Preferably, a gas chromatograph or a mass spectrometer is used as a fluid analyzer. The fluid analyzer may be installed at a location remote from the production well, but at a location within a designated field to which the production well is assigned. Alternatively, the fluid analyzer may be installed at a location proximate the producing well at the surface. It is noted that the method 300 may include calibrating the fluid analyzer to detect specific tracer materials.

In one aspect, the method 300 also includes determining which of a plurality of gas lift valves is passing the tracer materials into the production tubing. This is indicated at Box 345. This may be done by graphing a concentration of each of the tracer materials in the production fluids at the surface as a function of time. The step of Box 345 may include generating histograms of concentration of each tracer material in the return fluid. In support of this step, the method 300 includes measuring the concentration of the one or more tracer materials in the produced fluids at the surface as a function of time. This is seen at Box 350. The step of Box 350 is done by using the fluid analyzer.

Figure 3B:
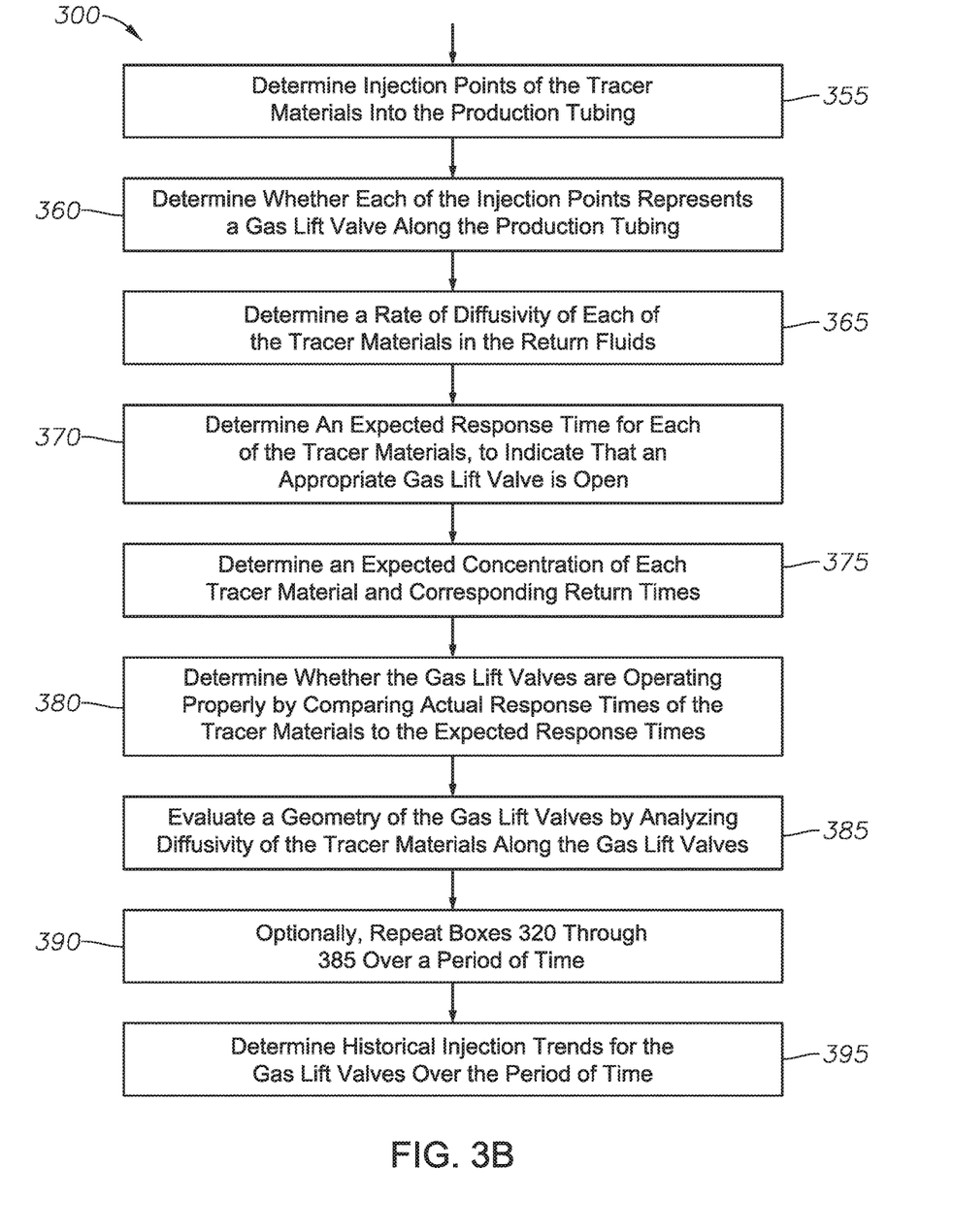

In one aspect, the method 300 further includes determining injection points of the one or more tracer materials into the production tubing, and then determining whether each of the injection points represents a gas lift valve along the production tubing. This is shown at Boxes 355 and 360, respectively. The step 355 of determining injection points comprises:

determining an injection time of the one or more tracer materials;

determining a volume of the annulus between the production tubing and the well casing per unit of depth;

determining the flow rate of the lift gas supplied to the well;

determining a velocity of the lift gas in the wellbore; or combinations thereof.

In one embodiment, the step 360 of determining whether each of the injection points represents a gas lift valve along the production tubing comprises:

determining an expected response time for each of the tracer materials, which would indicate that only an appropriate gas lift valve is open; and determining whether the gas lift valves are operating properly by comparing the actual response times of the at least one tracer materials to the expected response times.

The tubing-annulus contact points preferably represent a plurality of gas lift valves spaced along the production tubing.

In one aspect, the one or more tracer materials comprise at least two tracer components. The method 300 may then further comprise comparing diffusivity rates of each of the at least two tracer components in the lift gas to evaluate a geometry of each of the communication points (not shown in FIG. 3). In a more preferred embodiment, the one or more tracer materials comprise at least three tracer materials. Each of the at least three tracer materials has a different rate of diffusivity within the lift gas. The method 300 may then further comprise:

optimizing the fluid analyzer to detect each of the at least three tracer materials in the production fluids;

determining a rate of diffusivity of each of the at least three tracer materials (seen at Box 365);

determining an expected response time for each of the tracer materials to indicate that an appropriate gas lift valve is open (seen at Box 370);

determining an expected concentration of each tracer material and corresponding return times, which would indicate the presence of an open gas lift valve in the wellbore (seen at Box 375); and determining whether the gas lift valves are operating properly by comparing actual response times of the tracer materials to the expected response times (seen at Box 380).

In one embodiment, the method 300 further includes evaluating a geometry of the gas lift valves by analyzing diffusivity and concentration of the tracer materials as a function of time. This is provided at Box 385. Evaluating a geometry may include identifying open gas lift valves, identifying restricted gas lift valves, identifying leaks in gas lift valves and identifying leaks in the production tubing.

In another embodiment, the method 300 further comprises repeating the injection steps, the determining step and the evaluating a geometry step a plurality of times over a period of time. This is shown at Box 390. Results of the evaluating a geometry step over the period of time are then evaluated to determine historical injection trends for the gas lift valves. This is indicated at Box 395. Historical injection trends may be indicative of valve erosion, valve plugging or hole formation.

In an additional embodiment, the method 300 further includes replacing any gas lift valves that are determined to be defective based on the historical injection trends. Alternatively, the method includes adjusting selected gas lift valves based on the historical injection trends.

While it will be apparent that the inventions herein described are well calculated to achieve the benefits and advantages set forth above, it will be appreciated that the inventions are susceptible to modification, variation and change without departing from the spirit thereof. Improved methods for surveillance of a production well are provided using a fluid analyzer capable of detecting tracer materials at ppm levels.

What is claimed is:

1. A method for evaluating annulus-tubing communication points in a production well, the production well having one or more strings of casing extending below a surface, and a string of production tubing within the strings of casing thereby forming an annulus, and the method comprising:

placing up to 1,000 cc's of each of two or more tracer materials into a portable, hand-held vessel;

causing the two or more tracer materials to be injected from the vessel into the annulus of the well under pressure as part of a lift gas, wherein each of the two or more tracer materials defines a material that is not native to the production fluids;

further injecting the lift gas in order to cause each of the two or more tracer materials to contact the annulus-tubing communication points residing along the production tubing, and to enter the production tubing;

producing formation fluids along with lift gas and the two or more tracer materials to the surface;

detecting the two or more tracer materials at the surface by using a fluid analyzer, wherein the fluid analyzer is capable of detecting the two or more tracer materials at concentrations of less than 1,000 ppm; and measuring a concentration of each of the two or more tracer materials in the produced fluids as a function of time.

2. The method of claim 1, further comprising:

determining injection points of the two or more tracer materials into the production tubing; and determining whether each of the injection points represents a gas lift valve along the production tubing.

3. The method of claim 2, wherein determining injection points comprises:

determining an injection time of the two or more tracer materials;

determining a volume of the annulus between the production tubing and the well casing per unit of depth;

determining a flow rate of the lift gas supplied to the well;

determining a velocity of the lift gas in the wellbore; or combinations thereof.

4. The method of claim 3, wherein the communication points comprise open gas lift valves, holes in the production tubing, holes in gas lift valves, or combinations thereof.

5. The method of claim 3, wherein determining whether each of the injection points represents a gas lift valve along the production tubing comprises:

reviewing architecture for the wellbore to identify existing gas lift valves;

determining an expected response time for each of the tracer materials, which would indicate that only an appropriate gas lift valve is open; and determining whether the gas lift valves are operating properly by comparing actual response times of the at least one tracer materials to the expected response times.

6. The method of claim 5, wherein:

the one or more tracer materials are gases at downhole temperatures and pressures; and the method further comprises determining a composition of production fluids produced from the well.

7. The method of claim 5, wherein the two or more tracer materials comprise Ar, $N_2$, $O_2$, $SF_6$, He, Xe, or combinations thereof.

8. The method of claim 5, wherein the fluid analyzer is a gas chromatograph or a mass spectrometer.

9. The method of claim 5, wherein:

the two or more tracer materials comprise at least two tracer components; and the method further comprises:

determining a rate of diffusivity of each of at least three tracer materials; and comparing diffusivity rates of each of the at least two tracer components in the lift gas to (i) further identify gas lift valves; (ii) evaluate a geometry of each of the communication points, or (iii) both.

10. The method of claim 5, wherein:
the one or more tracer materials comprise at least three tracer materials; and
each of the at least three tracer materials has a different rate of diffusivity within the lift gas.

11. The method of claim 10, further comprising:
optimizing the fluid analyzer to detect each of the at least three tracer materials in the production fluids;
determining an expected concentration of each tracer material and corresponding return times, which would indicate the presence of an open gas lift valve in the wellbore; and
evaluating a geometry of the injection points by analyzing diffusivity and concentration of the tracer materials as a function of time.

12. The method of claim 11, wherein:
the tubing-annulus contact points represent a plurality of gas lift valves spaced along the production tubing; and
the method further comprises:
determining which of a plurality of gas lift valves is passing the one or more tracer materials into the production tubing;
repeating the injection steps, the producing step, the detecting step, the determining step and the evaluating a geometry step a plurality of times over a period of time; and
comparing results of the evaluating a geometry step over the period of time to determine historical injection trends for the gas lift valves.

13. The method of claim 12, further comprising:
replacing any gas lift valves that are determined to be defective based on the historical injection trends.

14. The method of claim 12, further comprising:
adjusting selected gas lift valves based on the historical injection trends.

15. The method of claim 11, wherein the evaluating a geometry step comprises inputting data into a program having computer executable instructions.

16. The method of claim 11, wherein the wellbore is an extended length wellbore that traverses multiple zones across more than 3,000 feet of horizontal hole below the gas lift valves.

17. The method of claim 1, wherein:
the vessel weighs less than 10 pounds, and
the method further comprises transporting the vessel to a well site of the production well.

18. The method of claim 17, wherein:
the two or more tracer materials are gases at surface temperatures and pressures;
the total volume of the vessel is less than 1,000 cubic centimeters; and
the vessel defines a single-use or reusable gas bottle, or a gas cartridge.

19. The method of claim 1, wherein:
the two or more tracer materials has a total volume in the vessel of less than 1,000 cubic centimeters of fluid; and
injecting two or more tracer materials into the annulus of the well under pressure as part of a lift gas comprises releasing the tracer materials into a lift gas line by means of a high-pressure syringe or a surface pump.

20. The method of claim 1, further comprising:
installing the fluid analyzer at a location remote from the production well, but at a location within a designated field to which the production well is assigned for production.

21. The method of claim 1, further comprising:
installing the fluid analyzer at a location proximate the production well.

22. A method for evaluating annulus-tubing communication points in a production well, the production well having one or more strings of casing extending below a surface, and a string of production tubing within the strings of casing thereby forming an annulus, and the method comprising:
placing up to 1,000 cc's of each of two or more tracer materials into a portable vessel, wherein each of the tracer materials defines a material that is not native to formation fluids from the production well;
determining a rate of diffusivity of each of the tracer materials;
causing the one or more tracer materials to be injected from the vessel into the annulus of the well under pressure as part of a lift gas;
further injecting the lift gas in order to cause the two or more tracer materials to contact the annulus-tubing communication points residing along the production tubing and to enter the production tubing;
producing the formation fluids along with lift gas and the two or more tracer materials to the surface as return fluids;
determining an expected concentration of each tracer material and corresponding return times, which would indicate the presence of an open gas lift valve in the wellbore;
detecting each of the tracer materials at the surface by using a fluid analyzer, wherein the fluid analyzer is capable of detecting each of the tracer materials at concentrations of less than 1,000 ppm;
measuring a concentration of each of the tracer materials in the return fluids as a function of time; and
determining injection points of the two or more tracer materials into the production tubing.

23. The method of claim 22, wherein:
the portable vessel is a hand-held vessel that holds no more than 1,000 cubic centimeters of fluid and that weighs no more than 10 pounds.

24. The method of claim 23, further comprising:
evaluating a geometry of the injection points by analyzing diffusivity and concentration of the tracer materials as a function of time.

25. The method of claim 24, wherein evaluating the geometry comprises determining whether each of the injection points represents a gas lift valve along the production tubing.

26. The method of claim 25, wherein evaluating a geometry further comprises identifying open gas lift valves, identifying restricted gas lift valves, identifying leaks in gas lift valves, identifying leaks in the production tubing, or combinations thereof.

* * * * *